Sept. 11, 1951

M. L. KAPLAN 2,567,714

CATHODE RAY TUBE

Filed Dec. 21, 1950

INVENTOR
Michael L. Kaplan
BY
Benjamin Sweedler
ATTORNEY

Patented Sept. 11, 1951

2,567,714

UNITED STATES PATENT OFFICE 2,567,714

CATHODE-RAY TUBE

Michael L. Kaplan, New Rochelle, N. Y., assignor, by mesne assignments, to Sightmaster Corp., New Rochelle, N. Y., a corporation of New York Application December 21, 1950, Serial No. 201,953

9 Claims. (Cl. 313—92)

This invention relates to improvements in cathode ray tubes, and more particularly to cathode ray tubes for color television receivers. This application is a continuation-in-part of application Serial No. 164,539 filed May 26, 1950.

One object of this invention is to provide a cathode ray tube such as a color or black and white kinescope which results in a picture of improved quality.

Another object is to provide a color kinescope in which the individual colors forming the color picture have increased contrast values.

Still another object is to provide a cathode ray tube which produces a picture, either black and white or colored, more restful to the eyes and thus reduces eye strain on the part of the observers of the television receiver.

Other objects and advantages of this invention will be apparent from the following detailed description thereof.

In accordance with this invention a cathode ray tube is provided having on or near the luminous screen at the large end thereof a reflecting surface composed of an alloy consisting essentially of from 10% to 30%, preferably about 20%, iron, and from 70% to 90%, preferably about 80%, of a metal from the group: nickel, chromium, silver, aluminum, rhodium, mercury and a mixture of at least two of the metals from this group. The transparent face plate of the tube, usually of glass, may also have such alloy film thereon or supported independently of the tube in front of the face plate to function as a filter, reducing glare and otherwise improving the clarity of the picture.

The alloy film, hereinabove described, I have found has the suprising property of transmitting and/or reflecting all colors of the spectrum in the visible light range with substantially equal uniformity. Hence, the cathode ray tube of this invention, having this film on or near the phosphors, reflects the different primary colors produced by illumination of the different phosphors by the electron streams, with equal intensity resulting in a color picture of increased contrast value in that little or no diminution of the contrast between the individual colors is lost. Likewise, in the case of a black and white kinescope the alloy film on the fluorescent screen reflects all colors of the visible spectrum uniformly resulting in sharper contrast between the black and white portions of the picture and eliminating "fuzziness" along the marginal edges of the contrasting areas.

The alloy film on the face blank disposed in front of the phosphors or supported directly in front of the tube functions as a filter, minimizing glare and yet transmitting the various colors of the spectrum in the visible light range substantially uniformly, thus maintaining the sharp contrast between the individual colors.

In the accompanying drawing forming a part of this specification and showing, for purposes of exemplification, preferred forms of this invention without limiting the claimed invention to such illustrative instances, Figure 1 is a perspective view of a tri-color kinescope embodying this invention;

Figure 1:
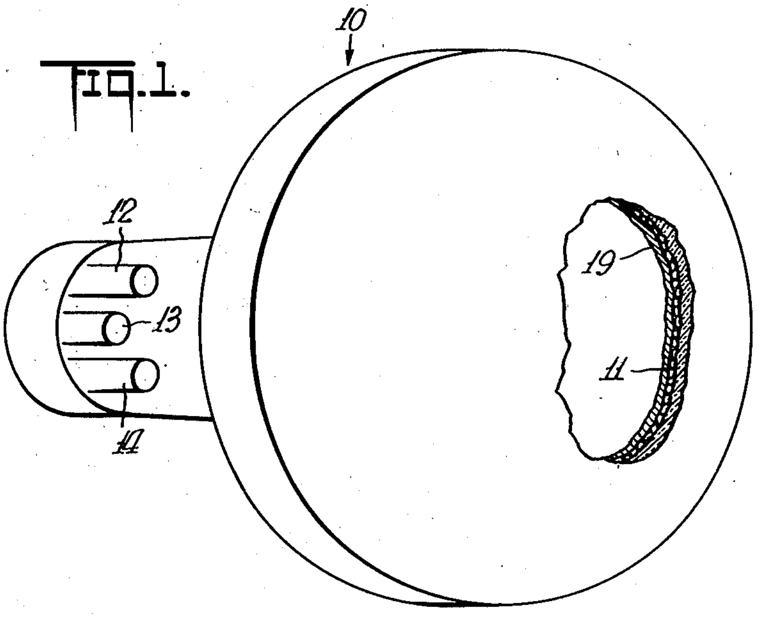

In Figure 1 of the drawing, 10 indicates a cathode ray tube having a fluorescent screen 11 adapted to be bombarded by three beams of electrons emitted from electron guns 12, 13 and 14, each producing a complete color picture in its own primary color, say red, blue and green. The three primary color pictures are produced simultaneously on the screen 11 and appear as a single full-color picture, as is well understood in this art.

Figure 2:
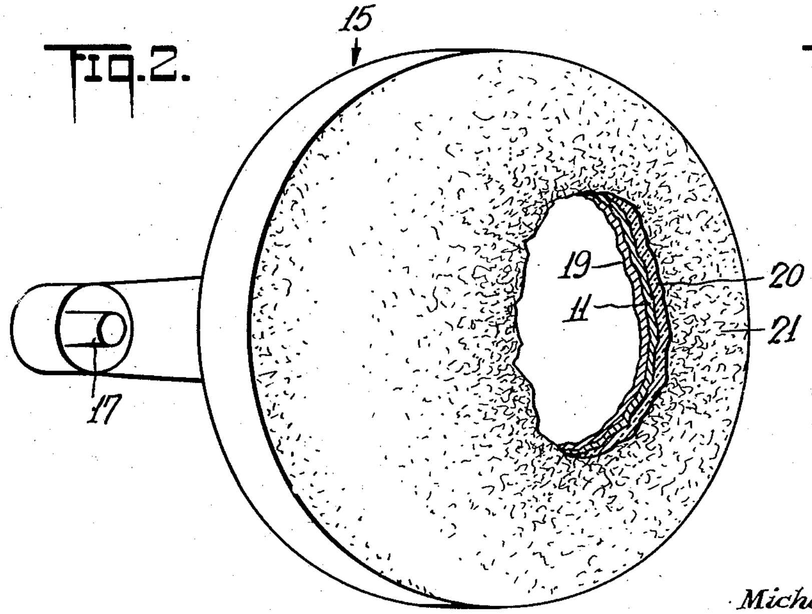
Figure 2 is a perspective view of a black and white kinescope embodying this invention.

Figure 2 shows a tube 15 having a fluorescent screen 11 adapted to be bombarded by a beam of electrons emitted from electron gun 17. The electron guns 12, 13 and 14 of Figure 1 and 17 of Figure 2, as well as the rest of the tube except the face plate portion, may be of any well known type. Also the tube may be of the all glass type or the type formed of a metal conical portion provided with a glass face plate on the inside of which the phosphors are deposited to produce the fluorescent screen. Since the structures of such tubes are well known in the art and since this invention is primarily concerned with the structure and composition of the face plate and the reflecting and/or transmitting surfaces associated therewith, it is believed unnecessary to further describe the remaining structure of the cathode ray tube.

As above noted, the face plate of the tube has formed on the inside of the large end thereof a fluorescent screen 11. In the case of color tubes different phosphors or fluorescent materials are deposited on the tubes in the form of dots, lines or other localized areas, so small and close together that when illuminated by the electron streams they present a continuous, full-color picture. Thus, for example, for a 16 inch tube approximately 600,000 dots of red, green and blue phosphors may be arranged in groups of three, each group consisting of a red, blue and green phosphor dot. Such arrangement is indicated by the layer of dots 18 shown in Figures 3 and 4. For a two color system instead of three, an arrangement of dots, lines or strips in groups of two, is of course utilized.

For the red phosphor, chromium activated aluminum beryllate, zinc cadmium sulfide activated by silver, zinc beryllium silicate, zinc cadmium sulfide, or zinc phosphate may be used. For the green phosphors alpha-willemite activated with manganese, or zinc cadmium sulfide activated with silver may be employed. For the blue phosphors, silver activated zinc sulfide, zirconium silicate, or calcium tungstate may be used. These phosphors may be deposited in localized areas on the glass face plate and bonded thereto employing suitable binders, such as alkali silicates, alkali borates, nitrocellulose, etc. The procedure disclosed, for example, in United States Patent 2,310,863 granted February 9, 1943 or any other known process may be employed in forming the fluorescent screen.

Associated with the luminescent screen 11 is a reflecting surface 19 which in the preferred embodiment, consists of a film of an alloy containing from 10% to 30%, preferably about 20%, iron, and from 70% to 90%, preferably about 80%, of a metal from the group consisting of nickel, mercury, chromium, silver, aluminum and rhodium. This invention, however, includes alloy films on a transparent supporting surface which film contains from 10% to 30%, preferably about 20%, iron, and from 70% to 90%, preferably about 80%, of two or more metals from the aforesaid group, the two or more metals from this group being mixed in any desired proportions to produce a neutral density film. The alloy may contain trace amounts of impurities present in the iron and the other metals with which the iron is alloyed. It will be understood therefore that the presence of small amounts of other materials in the alloy containing from 10% to 30% iron, and 70% to 90% of one or more of the other metals mentioned above comes within the scope of this invention. The preferred alloy consists essentially of about 20% iron and about 80% nickel.

The alloy film 19 is of a thickness of from $1 \times 10^{-6}$ to $100 \times 10^{-6}$ mm., preferably from $5 \times 10^{-6}$ to $30 \times 10^{-6}$ mm. It may be produced in any known manner. Preferably, the alloy film is formed by evaporating the alloy metal under vacuum and causing the metal vapors thus produced to contact the surface on which the film is to be formed. A coating of natural cellulose or other transparent protective material is deposited on the fluorescent screen and the alloy film deposited on this protective coating. The individual metals in the proper proportions to form the alloy may be evaporated to form a vapor mixture containing the desired proportions of individual metal vapors, or a preformed alloy may be evaporated to produce such vapor mixture. The amount of alloy metal thus deposited to form the film 19 should be such as to form a film of the thickness hereinabove noted.

Instead of depositing the alloy film on a cellulose coating on the phosphors constituting the fluorescent screen 11, the alloy film may be deposited on a glass or other transparent surface to produce a reflecting surface. This reflecting surface is then suitably supported in the tube near the fluorescent screen. For example, the glass support for the alloy film may be bonded to the tube walls in back of the fluorescent screen 11.

The beam or beams of electrons pass through the alloy film 19 and bombard the phosphors illuminating them. The alloy film serves to reflect light thus produced and which flows in a direction away from the face plate. The light thus reflected improves the intensity of the picture. In that the alloy film has the surprising property of reflecting the various colors of light in the visible spectrum uniformly, the clarity and quality of the picture is also improved. This is particularly marked in the case of colored pictures, because the alloy film reflects the different colors uniformly retaining the desired contrast between the individual colors, i. e., the original values of the different colors are intensified.

In the modification of the invention shown in Figure 2, the face 20 of the glass face plate is etched as indicated by the reference character 21. Either the face or back of the face plate may be etched. The etching, as is well known, may be effected by treating the glass with acid, e. g., hydrofluoric acid. Using an etched face plate, ambient light is diffused. In other words, light from extraneous light sources, such as lights within the room in which the television receiver is disposed, and which would be reflected from the face of the tube is diffused by having the face plate etched.

Figure 3:
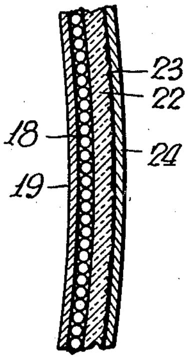
Figure 3 is a vertical section through the face plate of a kinescope and shows a modified form of this invention.

In the modification of Figure 3 the glass face plate 22 of the tube has its surface etched, as indicated by reference character 23, and has on the back thereof the phosphors 18 and the reflecting surface 19 as hereinabove described. Deposited on the face of the face plate 22 is an alloy film 24 produced as hereinabove described and having the composition hereinabove noted. This alloy film functions chiefly as a filter. Desirably, the filter has a density of from 20% to 50%, preferably about 35%. These values mean that the filter permits from 20% to 50%, preferably about 35%, of light in the visible range to pass therethrough and blocks out from 50% to 80%, preferably about 65%, of the light in the visible range.

Instead of depositing the alloy film 24 directly on the face plate 22 as in Figure 3, it may be deposited on a glass, plastic, or other transparent surface and suitably supported directly in front of the face plate 22. For example, the supported alloy film may be mounted in the cabinet of the television receiver, as shown in Figure 1 of my copending patent application Serial No. 164,539 filed May 26, 1950.

Figure 4:
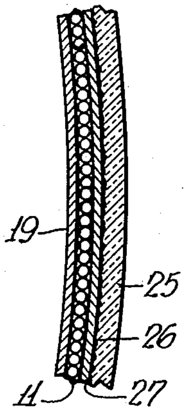
Figure 4 is a vertical section through the face plate of a kinescope and illustrates still another modified form of this invention.

Figure 4 discloses a modification in which the glass face plate 25 has its back etched as at 26, and has on the back thereof a semi-transparent reflecting alloy film 27 of the composition hereinabove noted. Formed on this alloy film is the fluorescent screen 11. A semi-transparent reflecting surface 19 of the composition above noted is in turn formed on the fluorescent screen 11. The fluorescent screen 11 may have a protective coating of natural cellulose on the opposite sides thereof separating the phosphors from the alloy films.

It will be noted the cathode ray tube of this invention produces pictures of improved intensity and quality and which are more restful to the eyes. In the case of color tubes, pictures are produced in which the individual colors retain their original contrast values.

Since different embodiments of this invention can be made without departing from the scope thereof, it is intended that all matter in the above description or shown in the accompanying drawing shall be interpreted as illustrative and not in a limiting sense.

What is claimed is:

1. A cathode ray tube having a fluorescent screen on the inside of the large end thereof and having a reflecting surface for said screen, said reflecting surface consisting of an alloy containing from 10% to 30% iron and from 70% to 90% of a material from the group consisting of nickel, mercury, chromium, silver, aluminum, rhodium and a mixture of at least two of said metals nickel, mercury, chromium, silver, aluminum and rhodium.

2. In a cathode ray tube having a face plate comprising a transparent surface, a fluorescent screen on said transparent surface and a reflecting surface for said screen, said reflecting surface consisting of an alloy containing from 10% to 30% iron and from 70% to 90% of a metal from the group consisting of nickel, mercury, chromium, silver, aluminum and rhodium.

3. A cathode ray tube as defined in claim 2, in which said alloy consists essentially of about 20% iron and about 80% nickel.

4. A cathode ray tube having a face plate comprising a transparent surface, phosphors which produce different colors when illuminated by electrons on said surface and a reflecting surface contiguous to said phosphors, said reflecting surface being constituted of an alloy film consisting essentially of from 10% to 30% iron and from 70% to 90% of a material from the group consisting of nickel, mercury, chromium, silver, aluminum, rhodium and a mixture of at least two of said metals nickel, mercury, chromium, silver, aluminum and rhodium.

5. A cathode ray tube as defined in claim 4, in which said alloy film consists essentially of about 20% iron and about 80% nickel.

6. A cathode ray tube having a face plate comprising a transparent surface, an alloy film on said surface consisting essentially of from 10% to 30% iron and from 70% to 90% of a material from the group consisting of nickel, mercury, chromium, silver, aluminum, rhodium and a mixture of at least two of said metals nickel, mercury, chromium, silver, aluminum and rhodium, a fluorescent screen on said film, and a reflecting surface disposed contiguous to said fluorescent screen, said reflecting surface being constituted of an alloy film consisting essentially of from 10% to 30% iron and from 70% to 90% of a material from the group consisting of nickel, mercury, chromium, silver, aluminum, rhodium and a mixture of at least two of said metals nickel, mercury, chromium, silver, aluminum and rhodium.

7. A cathode ray tube having a glass face plate, an alloy film on the front of said face plate consisting essentially of from 10% to 30% iron and from 70% to 90% of a material from the group consisting of nickel, mercury, chrominum, silver, aluminum, rhodium and a mixture of at least two of said metals nickel, mercury, chromium, silver, aluminum and rhodium, a fluorescent screen on the inside of said face plate and a semi-transparent reflecting surface for said screen, said reflecting surface being constituted of an alloy consisting essentially of from 10% to 30% iron and from 70% to 90% of a material from the group consisting of nickel, mercury, chrominum, silver, aluminum, rhodium and a mixture of at least two of said metals nickel, mercury, chromium, silver, aluminum and rhodium.

8. A cathode ray tube as defined in claim 7, in which the fluorescent screen is composed of a plurality of phosphors each generating a different primary color when illuminated by a beam of electrons, the phosphors being arranged in the form of small dots in groups, each group containing dots of phosphors generating different colors when illuminated by electrons.

9. A cathode ray tube as defined in claim 7, in which the face plate is etched.

MICHAEL L. KAPLAN.

REFERENCES CITED

The following references are of record in the file of this patent:

UNITED STATES PATENTS

| Number | Name | Date |
|---|---|---|
| 1,176,313 | Pfund | Mar. 21, 1916 |
| 1,222,049 | Tillyer | Apr. 10, 1917 |
| 2,090,922 | Von Ardenne | Aug. 24, 1937 |
| 2,312,206 | Calbick | Feb. 23, 1943 |
| 2,346,810 | Young | Apr. 18, 1944 |
| 2,409,356 | Hutchings | Oct. 15, 1946 |
| 2,461,464 | Aronstein | Feb. 8, 1949 |
| 2,476,619 | Nicoll | July 19, 1949 |
| 2,485,561 | Burroughs | Oct. 25, 1949 |
| 2,494,992 | Ferguson | Jan. 17, 1950 |